United States Patent
Ota

(10) Patent No.: US 8,149,449 B2
(45) Date of Patent: Apr. 3, 2012

(54) SYSTEMS AND METHODS FOR PRINT SCHEDULING

(75) Inventor: Ken Ota, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1405 days.

(21) Appl. No.: 11/731,169

(22) Filed: Mar. 29, 2007

(65) Prior Publication Data

US 2008/0239368 A1    Oct. 2, 2008

(51) Int. Cl.
    *G06K 15/00*     (2006.01)
    *G06F 3/12*     (2006.01)

(52) U.S. Cl. ..................... 358/1.16; 358/1.15

(58) Field of Classification Search .............. 358/1.16, 358/1.17, 1.18, 1.1, 1.5, 1.6, 1.9, 1.13, 1.14, 358/1.15, 402, 401, 403, 404, 444, 407, 468; 347/2, 3, 5, 14, 23; 399/1, 8, 9; 710/52, 710/53, 54, 55, 56, 57, 62, 64, 17, 15, 18, 710/19, 20, 21, 8; 711/100, 151, 158, 221
See application file for complete search history.

(56) References Cited

U.S. PATENT DOCUMENTS 7,019,863 B2 * 3/2006 Mathieson ................ 358/1.16
2003/0227651 A1 * 12/2003 Mathieson ................ 358/1.16

FOREIGN PATENT DOCUMENTS

JP     10-240479     9/1998

* cited by examiner

*Primary Examiner* — Dov Popovici
(74) *Attorney, Agent, or Firm* — Finnegan, Henderson, Farabow, Garrett & Dunner, L.L.P.

(57) ABSTRACT

In some embodiments of systems and methods for print scheduling, at least one of a plurality of entries in a request table associated with a printing device is updated with print job related information when a spool associated with a printing device is full. A priority is associated with the entries in the request table and an incoming print job is spooled at the time of a print job request, if the spool associated with the printing device is not full and the entry corresponding to the print job in the request table has the highest priority. Embodiments of the methods disclosed provide for the ordered processing of print jobs in a timely fashion with minimal alterations to existing protocols.

20 Claims, 4 Drawing Sheets

| | |
|---|---|
| USER INFORMATION | USER NAME, LOGIN ID |
| CLIENT INFORMATION | CLIENT ID, CLIENT ADDRESS, PORT NUMBER |
| JOB INFORMATION | JOB ID, JOB NAME, TIME |
| PRINT INFORMATION | NUMBER OF COPIES, RESOLUTION, BITS PER PIXEL |
| COLOR INFORMATION | COLOR, COLOR SEPARATION, COLOR MATCHING |
| IMAGE INFORMATION | BRIGHTNESS, CONTRAST, CHROMA |
| RENDERING INFORMATION | SMOOTHING, HALFTONE, |
| MEDIA INFORMATION | MEDIA SOURCE, MEDIA TYPE, OUTPUT TRAY, ORIENTATION, COLLATION, STAPLING |

| CLIENT ID | JOB ID | JOB SIZE | USER ID | TIME RECEIVED | |
|---|---|---|---|---|---|
| | | | | | |
| 198.21.22.2 | ACDE48007... | 52 | ken | 11.00.01 | |
| 198.21.22.7 | ACDE99057... | 27 | jon | 11.00.03 | |
| 198.21.22.12 | DXEF47012... | 55 | ian | 11.01.07 | |
| 198.21.22.32 | RJ10748007... | 1 | mac | 11.04.01 | |

400

FIG. 4

SYSTEMS AND METHODS FOR PRINT SCHEDULING

BACKGROUND

1. Field of the Invention

The present invention relates to the field of printing systems management and in particular, to systems and methods for print scheduling.

2. Description of Related Art

Printing devices and printing systems are ubiquitous in modern office settings, in the home, and in home-office environments. As the cost of printing devices continues to decrease, a greater choice of printers may be available to users in most environments. In large office systems, a print server may be paired with printers and off load several activities from sending devices and the printers. For example, the print server may queue jobs when one or more printers is busy and forward to the job to a specified printer at a later time.

Print servers require additional memory and firmware and may add significantly to the cost of printing devices. Consequently, print servers are often implemented using older computers with limited functionality. However, in larger or more expensive printing devices, server functionality may be integrated into the printing device. If the print server is implemented on a separate computer, separate installation, administration, and management may be required thereby increasing the cost and complexity of system administration.

In the context of a small business or a home environment where lower cost printers predominate, the functionality and convenience afforded by print servers may be lacking. Moreover, low cost printing devices generally have limited memory and therefore have lower print spooling capacity. Print spooling is the process by which a print job is stored in a memory location for later processing. When a print job is spooled, it has been stored in memory for later processing by a printing device. Print spool memory may reside on the printer, a print controller, or a print server.

Print spooling allows a print job to be processed in the background and frees the sending device to perform other functions. The sending device or print client or simply client may be a computer, camera, or any other device requiring the services of the printing device. When the print spool is full, the sending device waits and retries at random intervals until the printing device is able to accept new jobs. In such situations, there is no guarantee that a sending device will be able to spool its job during the next retry. For example, other computers and/or devices may have filled the print spool with new jobs in the interim if one or more preexisting print jobs had completed prior to the sending device's next retry.

The "spool full" problem may be exacerbated if a printer or a pool of printers is being shared by a large number of devices, or in an environment that is print heavy, such as in a document processing environment. Although, the "spool full" problem may occur more frequently when lower cost devices with smaller spool memory are shared, it may also occur with larger print devices depending on the number and type of print jobs that are being sent to the device. The "spool full" problem can be very frustrating for users because there is no guarantee that a print job will be processed in a timely manner.

Thus, there is a need for a system, method, and apparatus that permits the scheduling and efficient processing of print jobs and operates using existing protocols for sending and/or receiving print jobs.

SUMMARY

In some embodiments, a method for scheduling print jobs for processing comprises updating at least one of a plurality of entries in a request table associated with a printing device with print job related information when a spool associated with a printing device is full. A priority is associated with the entries in the request table, and a print job is spooled at the time of a print job request, if the spool associated with the printing device is not full and the entry corresponding to the print job in the request table has the highest priority. The print spool and the request table may be stored in physically separate memories, or in logically separate sections of a common physical memory.

Updating at least one of a plurality of entries further comprises one or more of: updating expiry period information associated with an entry for a print job; deleting entries associated with spooled jobs from the request table; and adding an entry with information pertaining to a print job, if the request table does not include an entry corresponding to the print job. Further, updating expiry period information associated with an entry for a print job may comprise one or more of: resetting the expiry time period associated with an entry for a print job; and deleting expired entries from the request table.

The expiry period may be fixed, or dynamically altered based on one or more of: a temporal distribution of print jobs received by the printing device in a preceding time interval; the average size of print jobs received by the printing device; the current time of day; and the size of a print job currently being printed by the printing device.

A priority may be associated with entries in the request table by using print job related information to determine a priority for each entry. Print job related information may be obtained from a print header associated with the print job and may comprise one or more of: the time the print job was first received by the printing device; the size of the print job; the identity of the device sending the print job; and the identity of the user sending the print job.

BRIEF DESCRIPTION OF THE DRAWINGS

FIG. 2 shows exemplary typical information contained in a print header.

FIG. 4 shows an exemplary table with entries corresponding to print jobs.

DETAILED DESCRIPTION

Figure 1:
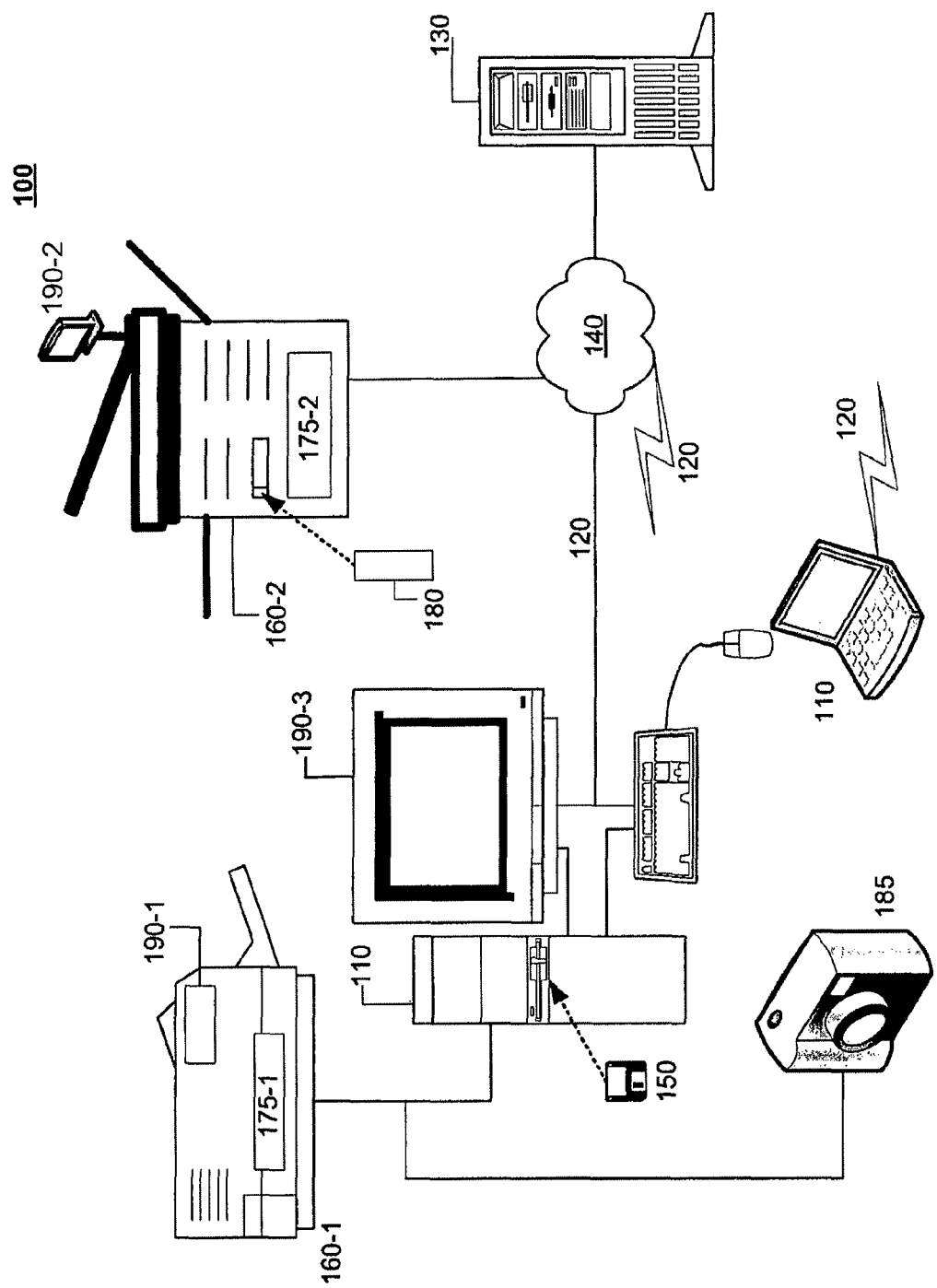
FIG. 1 shows a block diagram of an exemplary system for print scheduling.

FIG. 1 shows an exemplary block diagram of a system for print accounting. A computer software application consistent with the present invention may be deployed on one or more networked computers, or printers, as shown in FIG. 1, that are connected through communication links that allow information to be exchanged using conventional communication protocols and/or data port interfaces.

As shown in FIG. 1, exemplary system 100 includes a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices too (not shown). Computing device 110 and server 130 may be capable of executing software (not shown) that allows the control and configuration of printing devices 160, such as exemplary printing devices 160-1 and 160-2.

Computing device 110 may contain a removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with embodiments of the present invention. Portions of software applications may reside on removable media and be read and executed by computing device 110 using removable media drive 150. In some embodiments, results or reports generated by applications may also be stored on removable media.

Connection 120 couples computing device 110, server 130, and printer 160-2 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB, SCSI, FIREWIRE, and/or BNC ports for transmission of data through the appropriate connection 120. The communication links could be wireless links or wired links or any combination that allows communication between computing device 110, server 130, and printer 160-2.

Network 140 could include a Local Area Network (LAN), a Wide Area Network (WAN), or the Internet. In some embodiments consistent with the present invention, information sent over network 140 may be encrypted to ensure the security of the data being transmitted.

Exemplary printing device 160-2, may be a network printer, and can be connected to network 140 through connection 120. In some embodiments, a printing device, such as exemplary printing device 160-1, may be a local or dedicated printer and connected directly to computing device 110 and/or server 130 and/or other peripherals such as exemplary digital camera 185. Digital camera 185 may be capable of communicating with printing device 160-1 directly using a protocol such as PictBridge or through computer 110. Printing devices, such as exemplary printing device 160-2, may also have ports for the connection of flash drives, USB drives, or other storage devices 180, as shown in FIG. 1. System 100 may include multiple printing devices and other peripherals (not shown), according to embodiments of the invention.

Printing devices 160 may be controlled by hardware, firmware, or software, or some combination thereof. Printing devices 160 may include one or more print controller boards 175, such as exemplary print controllers 175-1 and 175-2, which may control the operation of printing devices 160. Printing devices 160 may be controlled by firmware or software resident on memory devices in print controllers 175. In general, print controllers 175 may be internal or external to the print devices 160. In some embodiments, printing devices 160 may also be controlled in part by software running on computing device 110 or server 130.

Printing devices, such as exemplary printing device 160-2, may also include consoles 190 such as consoles 190-1 and 190-2, or other interfaces to allow configuration options to be set and other messages to be displayed. In some embodiments, one or more configuration options may be set using a display or user-interface on a monitor for a computer coupled to printing devices 160. For example, user interfaces to set one or more configuration options on printing device 160-1 may be displayed on monitor 190-3, which is coupled to computer 110. A user interface to set configuration options on printer 160-2 may also be displayed on monitor 190-3, using software running on server 130.

In some embodiments, configuration parameters pertaining to printing device 160 may be user-configurable. For example, the print resolution, document sizes, color options, and other configuration parameters may be user-configurable. A user may also be able to specify input trays and the use of automatic document feeders to allow batch processing of documents. Users may also be able to log into a printing device 160 to perform administrative functions such as to enable software or firmware on printing device 160 to perform various functions. In some embodiments, the log in process may require a password or other user-authentication mechanism.

A computer software application consistent with the present invention may be deployed on any of the exemplary computers, or printers as shown in FIG. 1. For example, computing device 110 could execute software that may control and/or monitor the operation of printer 160-1. An independent application may also execute concurrently on printer 160-2 based on its configuration. In another example, an application resident on print controller 175-1 could be configured using computer 110 but execute on printing device 160-1. In general, applications may execute in whole or in part on one or more computers, print controllers, or printers in the system.

FIG. 2 shows exemplary print header information 200 included in a print job. When a user decides to print a document, the print job sent to printing device 160 may contain a header. The header is used to identify the user, the sending device, or client, and may also contain device configuration and job processing information. For example, user Information may include the user login-id, user name and other information associated with the user's account. Client information may include information about the client such as the client ID, network client address, and port number. In some embodiments, the network client address of the client may be specified by a TCP/IP address. In general, the list of sending device or clients could include any print job generating device such as computer 110, server 130, camera 185, or any other peripheral capable of sending jobs to printer 160.

Job information may include a job name and/or identifier and the time of submission. In some embodiments, the job-id number may be a unique identifier assigned to the print job by a print driver running on the client. Print header information 200 may also include information related to processing the print job such as color, image, rendering, and media information. For example, image related information may include luminance information such as brightness and contrast, and/or chroma information, such as saturation. Rendering information can include information related to half-toning and smoothing options for images and text. Media information may include information about media type such as paper size, paper orientation, paper tray, stapling and/or collating options.

In general, the type of print header information 200 may vary depending on the printer and the capabilities of the page description language (PDL). PDL's may include PostScript, Adobe PDF, HP PCL, Microsoft XPS, and variants thereof as well as any other languages used to describe pages in a document. In some embodiments, a proprietary PDL and/or a modified and/or extended version of a standard PDL may be used.

Figure 3:
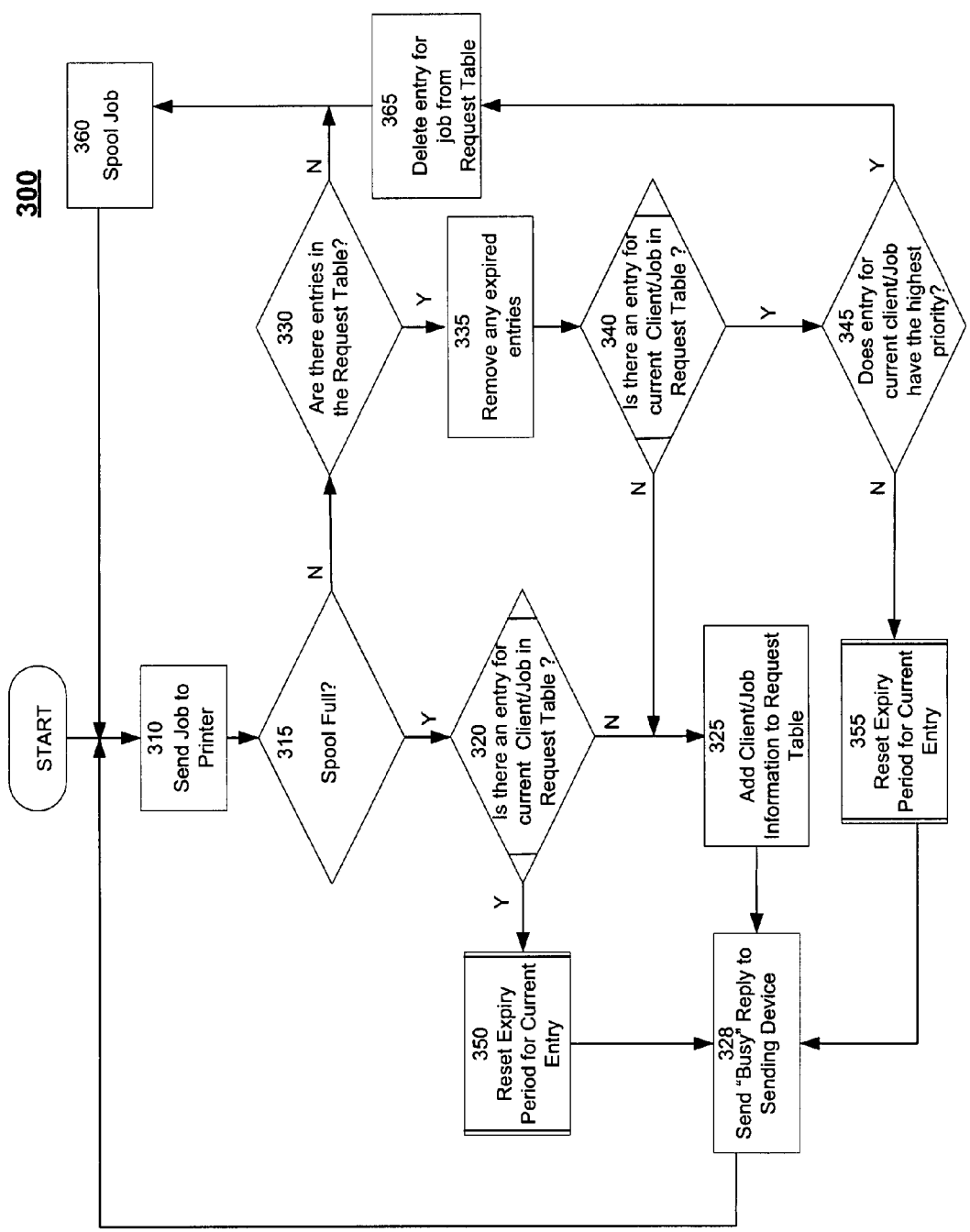
FIG. 3 shows a flowchart describing an exemplary method for print scheduling.

FIG. 3 shows a flowchart 300 describing an exemplary method for print scheduling. The exemplary method shown in flowchart 300 may be implemented by one or more of printing device 160 and/or print controller 175. In step 310, a sending device sends a job to a printing device, such as exemplary printing device 160. In step 315, the printing device checks if its spool is full. If the spool is full, the printing device may add information about the job to a Request Table, which may be exemplary Request Table 400. In some embodiments, Request Table 400 may include a list of jobs received by printing device 160 that have not been spooled. An entry in exemplary Request Table 400 may correspond to a specific job received (but not as yet spooled) by printing device 160.

FIG. 4 shows an exemplary Request Table 400. Exemplary Request Table 400 may be used to hold information pertaining to a specific print job. Details pertaining to a new job may be added to Request Table 400 if the print spool for printing device 160 is full. In some embodiments, Request Table 400 may be checked before details pertaining to a new job are added to prevent duplicate entries. The entry pertaining to a job may be deleted if the job has been processed, or if another request for the same job is not received within some specified time.

Request Table 400 may include one or more fields such as a Client ID, Job ID, Job Size, User ID, the time a job request was received, and/or other parameters related to the print job. Fields in exemplary Request Table 400 may also include additional information about clients, users, and/or other information associated with a job. In general, any relevant information provided in or associated with print header information 200 may be used as fields in Request Table 400. Exemplary Request Table 400 may reside in a separate logical or physical memory in printing device 160, print controller 175 and/or a memory device coupled to printing device 160 or print controller 175. Memory for Request Table 400 may comprise logically distinct memory reserved or allocated from a common memory. In some embodiments, memory for Request Table 400 may be allocated and de-allocated as new requests are added and pending requests are processed.

In step 315, the spool for printing device 160 is checked. If the spool for printing device 160 is not full, then, in step 330, Request Table 400 may be checked to determine if there are any entries in Request Table 400. In step 360, the job may be spooled if there are no entries in Request Table 400. If the check of Request Table 400 in step 330, determines that there are entries in exemplary Request Table 400, then Request Table 400 may be checked for expired entries. Expired entries may be removed in step 335.

Any entry in Request Table 400 may be associated with an expiry period. The expiry period may determine the length of time that entries in the table will remain pending before they are removed. For example, the expiry period for entries in Request Table 400 may be set at 10 minutes. If an entry in Request Table 400 has been pending more than 10 minutes it may be deleted. In one embodiment, the expiry period may be set or preset to some default value by a system administrator or a printing device manufacturer. In some embodiments, the default value may be changed at run time based on statistics related to print jobs, such as the distribution of job sizes, frequency of print requests, time of day, the distribution of jobs during a time interval preceding the current time, the temporal distribution of jobs during the day, etc. For example, a longer expiry period may be set for times in a day when the number of print requests is higher. As another example, the expiry period may be increased if printing device 160 is currently printing a large print job. Printing device 160 may be configured to automatically change the expiry period at run time based on statistics maintained by and/or provided to it. The expiry period may also be changed by a system administrator.

In step 340, exemplary Request Table 400 is checked to determine if an entry for the currently received job already exists. If exemplary Request Table 400 already includes an entry for the current job, then, in step 345, the entry associated with the current job is checked to see if it has the highest priority.

The priority associated with an entry may be determined in step 345 using the job related information associated with an entry in Request Table 400. For example, the earliest received job may be assigned the highest priority i.e. processed on a First Come First Served basis. In another example, jobs may be prioritized based on their size. In a further example, jobs may be prioritized based on users or sending devices (clients). In one embodiment, entries in Request Table 400 may be sorted according to one or more criteria to determine a priority for entries. In some embodiments, the priorities for Request Table entries may be calculated dynamically, in step 345, to determine the entry with the highest priority. Thus, a priority for each entry may be calculated based on specified criteria each time the exemplary procedure in step 345 is invoked. In general, a variety of schemes may be used to prioritize jobs and determine priorities associated with entries in Request Table 400. In step 365, the entry for a current job (which has been determined to have the highest priority) may be deleted from Request Table 400. The job may then be spooled, in step 360.

If the check of exemplary Request Table 400 (in step 340) indicates that no entry for the currently received job exists then an entry may added to Request Table 400, in step 325. In step 325, an entry for the current job may be created, which may include a job identifier and other job related details. Next, in step 328, a "busy" signal is sent to the sending device to indicate that the job will not be processed at the current time. The sending device may resend the job to printing device 160 at one or more later times. The busy signal may be sent over connection 120 or network 140 using any appropriate protocol established between the sending device and printing device 160.

If the check of the current job's entry (in step 345) indicates that the current job does not have the highest priority then its expiry period may be reset in step 355. Resetting the expiry period for a job in Request Table 400 whenever the job is received, but not spooled, by printing device 160 permits the job to remain pending. In step 328, a "busy" signal is sent to the sending device to indicate that the job will not be processed at the current time. The process depicted in FIG. 3, repeats as new jobs are received by printing device 160.

Note that methods consistent with embodiments of the invention may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Moreover, there are many computers, printing devices, and operating systems that may be used in practicing embodiments of the instant invention and, therefore, no specific detailed programs could be provided that would be applicable to each of these different systems. Each user of a particular environment will be aware of the language, hardware, and tools that are most useful for that user's needs and purposes.

The above-noted features and aspects of the present invention may be implemented in various environments. Such environments and related applications may be specially constructed for performing the various processes and operations of the invention, or they may include a general-purpose computer or a multi-function printing device that includes a local computing platform selectively activated or reconfigured by program code to provide appropriate functionality. The processes disclosed herein are not inherently related to any printing device, particular computer or other apparatus, and aspects of these processes may be implemented by any suitable combination of hardware, software, and/or firmware. For example, various general-purpose machines may be used with programs written in accordance with teachings of the invention, or it may be more convenient to reconfigure or construct a specialized printing apparatus or system to perform the required methods and techniques.

Embodiments of the present invention also relate to computer-readable media that include program instructions or program code for performing various computer-implemented operations based on the methods and processes of embodiments of the invention. The program instructions may be those specially designed and constructed for the purposes of the invention, or they may be of the kind well known and available to those having skill in the computer arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

The invention claimed is:

1. A method for scheduling print jobs for processing comprising:
   updating at least one of a plurality of entries in a request table associated with a printing device with print job related information when a spool associated with a printing device is full, wherein the entries in the request table correspond to print jobs that have been received but not yet spooled;
   associating a priority with the at least one of the plurality of entries in the request table; and
   spooling a print job at a time of a print job request, if the spool associated with the printing device is not full and an entry corresponding to the print job in the request table has a highest priority.

2. The method of claim 1, wherein updating at least one of a plurality of entries further comprises one or more of:
   updating expiry period information associated with an entry for a print job;
   deleting entries associated with spooled jobs from the request table; and
   adding an entry with information pertaining to a print job, if the request table does not include an entry corresponding to the print job.

3. The method of claim 2, wherein updating expiry period information associated with an entry for a print job comprises one or more of:
   resetting the expiry period associated with an entry for a print job; and
   deleting expired entries from the request table.

4. The method of claim 1, wherein associating a priority with entries in the request table further comprises using print job related information to determine a priority for each entry.

5. The method of claim 4, wherein the print job related information is obtained from a print header associated with the print job.

6. The method of claim 4, wherein the print job related information comprises one or more of:
   time the print job was first received by the printing device;
   size of the print job;
   identity of a device sending the print job; and
   identity of a user sending the print job.

7. The method of claim 2, wherein the expiry period is fixed.

8. The method of claim 2, wherein the expiry period is dynamically altered based on one or more of:
   a temporal distribution of print jobs received by the printing device in a preceding time interval;
   an average size of print jobs received by the printing device;
   current time of day; and
   size of a print job currently being printed by the printing device.

9. The method of claim 1, wherein the printing device may comprise one or more of:
   a printer coupled to a network; and
   a print controller coupled to a printer coupled to a network.

10. The method of claim 1, wherein the spool and the request table are stored in physically separate memories.

11. The method of claim 1, wherein the spool and the request table are stored in logically separate sections of a common physical memory.

12. A non-transitory computer-readable medium that stores instructions that when executed by a processor perform steps in a method for scheduling print jobs for processing, the steps comprising:
   updating at least one of a plurality of entries in a request table associated with a printing device with print job related information when a spool associated with a printing device is full, wherein the entries in the request table correspond to print jobs that have been received but not yet spooled;
   associating a priority with the at least one of the plurality of entries in the request table; and
   spooling a print job at a time of a print job request, if the spool associated with the printing device is not full and an entry corresponding to the print job in the request table has a highest priority.

13. The computer readable medium of claim 12, wherein updating at least one of a plurality of entries further comprises one or more of:
   updating expiry period information associated with an entry for a print job;
   deleting entries associated with spooled jobs from the request table; and
   adding an entry with information pertaining to a print job, if the request table does not include an entry corresponding to the print job.

14. The computer readable medium of claim 13, wherein updating expiry period information associated with an entry for a print job comprises one or more of:
   resetting the expiry period associated with an entry for a print job; and
   deleting expired entries from the request table.

15. The computer readable medium of claim 12, wherein associating a priority with entries in the request table further comprises using print job related information to determine a priority for each entry.

16. The computer-readable medium of claim 12, wherein the print job related information comprises one or more of:
   time the print job was first received by the printing device;
   size of the print job;

identity of a device sending the print job; and
identity of a user sending the print job.

17. A system comprising at least one printing device coupled to a plurality of print job generating devices, wherein the printing device and the plurality of print job generating devices perform steps in a method for scheduling print jobs for processing, the steps comprising:
   updating at least one of a plurality of entries in a request table associated with the printing device with print job related information when a spool associated with the printing device is full, wherein the entries in the request table correspond to print jobs that have been received but not yet spooled;
   associating a priority with the at least one of the plurality of entries in the request table; and
   spooling a print job at a time of a print job request, if the spool associated with the printing device is not full and an entry corresponding to the print job in the request table has a highest priority.

18. The system of claim 17, wherein updating at least one of a plurality of entries further comprises one or more of:
   updating expiry period information associated with an entry for a print job;
   deleting entries associated with spooled jobs from the request table; and
   adding an entry with information pertaining to a print job, if the request table does not include an entry corresponding to the print job.

19. The system of claim 16, wherein updating expiry period information associated with an entry for a print job comprises one or more of:
   resetting the expiry period associated with an entry for a print job; and
   deleting expired entries from the request table.

20. The system of claim 17, wherein associating a priority with entries in the request table further comprises using print job related information to determine a priority for each entry.

* * * * *